Figure 3:
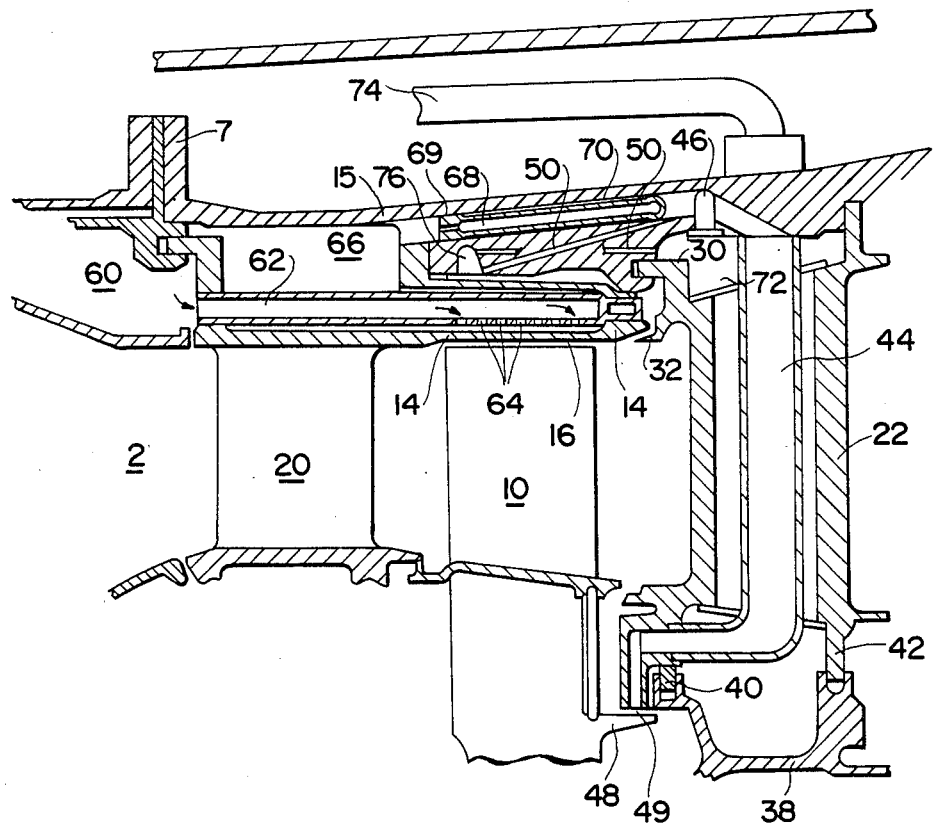

United States Patent [19]

Fuller et al.

[11] Patent Number: 4,804,310

[45] Date of Patent: Feb. 14, 1989

[54] CLEARANCE CONTROL APPARATUS FOR A BLADED FLUID FLOW MACHINE

[75] Inventors: John R. D. Fuller; John K. A. Bell, both of Bristol, England

[73] Assignee: ROLLS-ROYCE plc, England

[21] Appl. No.: 745,929

[22] Filed: Dec. 1, 1976

[30] Foreign Application Priority Data

Dec. 2, 1975 [GB] United Kingdom ............... 49322/75

[51] Int. Cl.[4] .............................................. F01D 11/08
[52] U.S. Cl. .................................. 415/115; 415/116; 415/134; 60/39.29
[58] Field of Search ................. 415/84, 115, 116, 134, 415/174; 60/39.66, 39.29

[56] References Cited

U.S. PATENT DOCUMENTS

| | | | |
|---|---|---|---|
| 3,535,873 | 10/1970 | Szydlowski | 60/39.66 |
| 3,584,458 | 6/1971 | Wetzler | 60/39.66 |
| 3,975,901 | 8/1976 | Hallinger et al. | 415/115 |
| 4,023,731 | 5/1977 | Patterson | 415/116 |

FOREIGN PATENT DOCUMENTS 1248198  9/1971  United Kingdom .

Primary Examiner—Stephen C. Bentley
Attorney, Agent, or Firm—Parkhurst, Oliff & Berridge

[57] ABSTRACT

In a gas turbine engine the clearance between the tips of a row of rotor blades and the surrounding casing is maintained in a pre-determined range by providing supplies of relatively hot and cold air to passages in the casing. The amount of hot or cold air which is allowed to pass through the passages is controlled by exhausting the flow from the passages through a control clearance which varies in proportion to the size of the clearance to be controlled.

8 Claims, 2 Drawing Sheets

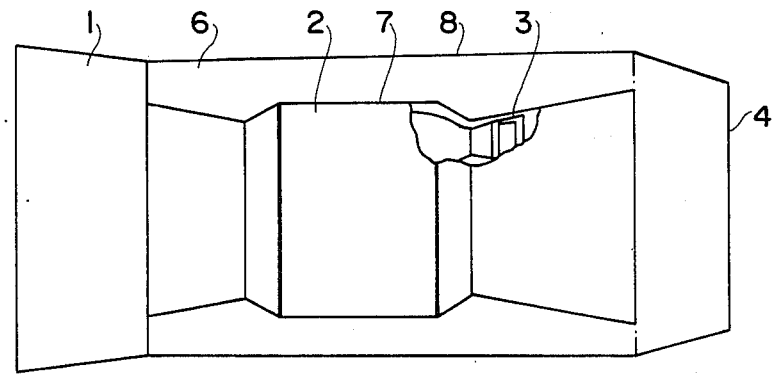
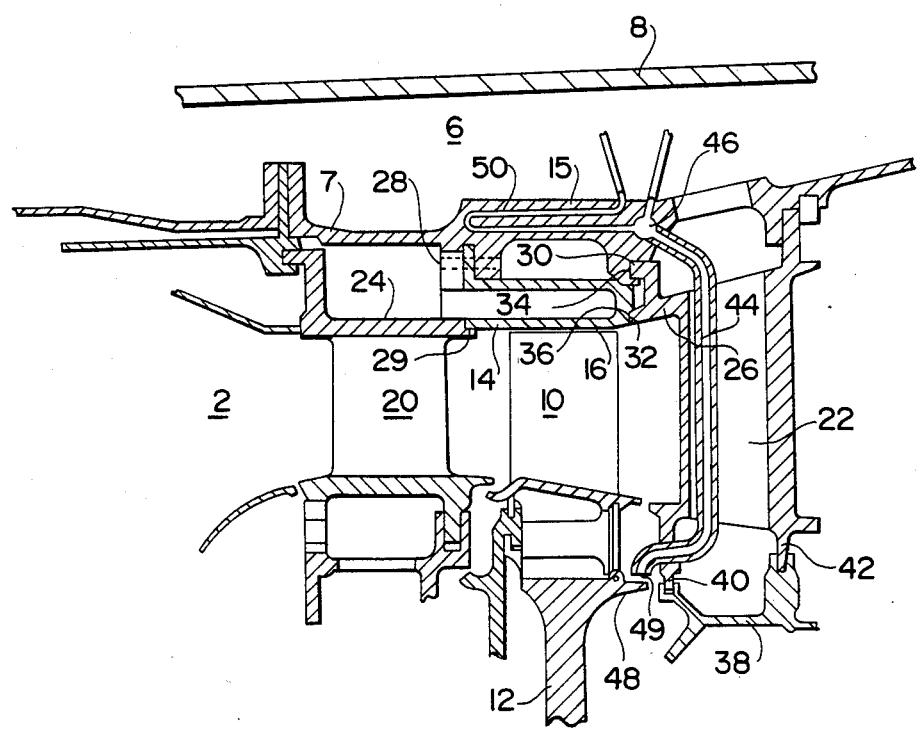

CLEARANCE CONTROL APPARATUS FOR A BLADED FLUID FLOW MACHINE

The present invention relates to the control of tip clearances between the tips of rotating blades and their surrounding static structures in bladed fluid flow machines.

In gas turbine engines, particularly in the turbines thereof, the rotor blades have in the past been provided with shrouds at their tips, the internal surfaces of which define the radially outer limit of the gas passage through the blades. Leakage of working fluid from the gas passage is thus confined to leakage at the axial ends of the shrouds and at the contacting edges of the shrouds and this can be sealed more effectively than leakage over the tips of an unshrouded blade. This adds to the efficiency of the blading but also adds to the weight, the stress and the cost of manufacture of the blades.

Because of the greater tip leakage for a given clearance in an unshrouded turbine, compared with a shrouded blade design, it is even more necessary that the clearance should be small at important running conditions. Clearance variation results from the difference between casing and rotor expansions, both of which are large in comparison with the required clearances, and hence relatively large changes in clearance may be produced by small temperature changes at different running conditions. This may result in undesirably large clearances at some conditions, if rubbing is to be avoided at other (particularly transient) conditions.

Occasional rubbing may be acceptable in the case of shrouded blades with knife-edged seals, but it is dangerous in unshrouded blades in which rubbing over the whole of the blade tip profile could occur.

Thus, although for equal efficiency the unshrouded blade running clearance should be less than for the shrouded design, in practice, without some form of control it would have to be greater to allow for transient conditions.

If unshrouded blades, with their advantages of lower C.F. stress, more robust section for the same weight and lower cost, are to be used without efficiency loss, then a more certain and accurate control of tip clearance is required than can be achieved by relying on estimated temperatures and growths in the rotor and casing.

The object of the present invention is to provide a tip clearance control system for a bladed rotor of a fluid flow machine which maintains the tip clearance within a pre-determined range under most operating conditions of the machine.

According to the present invention, there is provided a bladed fluid flow machine including a non-rotating structure, a bladed rotor having a circumferential array of blades around the periphery thereof and spaced radially at their tips from the non-rotating structure to define a clearance therebetween, and clearance control mechanism comprising, a casing element forming part of the non-rotating structure and from which the tips of the blades are spaced to define the clearance, means for varying the temperature of the casing element to cause thermal expansion and contraction thereof, and means responsive to a change in the size of the clearance for controlling the variation in temperature of the casing element to cause said expansion or contraction to take place in a direction to maintain the size of the clearance in a pre-determined range.

The temperature of the casing element may be varied by any appropriate means but is preferably varied by supplying working fluid at different temperatures from other parts of the machine to passages formed in the casing element. This means of temperature variation is particularly suitable where the machine is an aircraft gas turbine engine.

In a preferred form of the invention the casing element includes a shroud ring surrounding and radially spaced from the tips of the blades to define the clearance, and which is connected to the remainder of the casing element for movement therewith when the casing element expands or contracts.

The casing element may be an integral part of a casing surrounding the shroud ring or may itself be a relatively massive ring having a significantly lower rate of thermal expansion than the shroud ring and mounted movably for expansion within a surrounding casing.

One form of control means comprises a number of tubes through which the supply of working fluid is exhausted after passage through the casing element, the rate of flow of fluid through the tubes being determined by positioning the ends of the tubes close to a control surface carried by the rotor so as to define a control clearance for the fluid. The tubes may be passed through and be supported in the vanes of an adjacent stator vane row which in turn are supported in the non-starting structure. Thus any expansion, or contraction of the casing element relative to the rotor blade tips results in a corresponding increase or decrease of the clearance between the tubes and the control surface. The resulting change in flow through the tubes is made to control the flow of cooling and heating fluids in the passage of the casing element.

Figure 4:
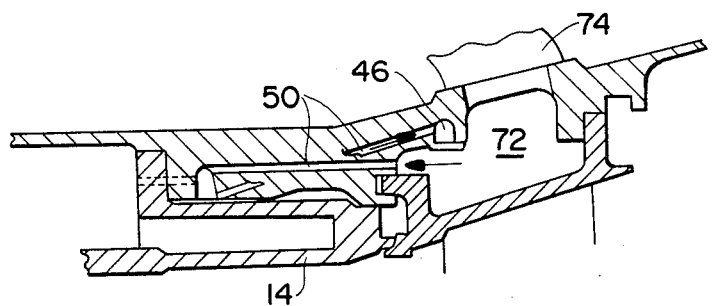

The invention will now be more particularly described merely by way of example, with reference to the accompanying drawings in which;

FIG. 1 is a diagrammatic view of a gas turbine engine, the turbine casing of which is shown broken away to illustrate the area of the engine to which the invention has been applied, FIG. 2 is an enlarged view of the turbine area of the engine showing, again diagrammatically, details of the structure required when the invention is incorporated, FIG. 3 is a further enlarged view of the passages for the heating or cooling fluid flows in an actual engine construction, and FIG. 4 is a section similar to that of FIG. 3 but taken at a point further round the engine and showing a general cross-section of the casing.

Referring now to the drawings, in FIG. 1 there is shown a gas turbine engine having compressor means 1, combustion equipment 2, turbines 3 and a propulsion nozzle 4 in flow series. A portion of the engine casing is shown cut away to illustrate a stage of one of the turbines to which the invention has been applied.

Part of the air compressed by the compressor means passes into a bypass duct 6, which is defined between the engine inner and outer casings 7 and 8 respectively, and bypasses the combustion equipment and the turbines.

FIG. 2 shows the turbine rotor and its associated structure in more detail. The turbine rotor consists of an annular array of blades 10 mounted on a rotor disc 12 by any conventional means not shown in detail. Surrounding the tips of the blades is a fixed segmented shroud 14 which is spaced radially from the tips of the blades to define a clearance 16. The shroud forms part of an element 15 of the engine inner casing which is a non-rotating structure, and it is the clearance 16 which it is desired to control.

Upstream of the turbine rotor is an annular array of nozzle guide vanes 20 which guide the exhaust gases from the combustion equipment 2 on to the rotor blades 10, and downstream of the rotor is a further annular array of stator vanes 22 which receive hot gases from the rotor blades 10 and guide them on to the next stage of rotor bladings (not shown).

All of the above described structure is mounted within the engine inner casing 7. On the radially outer side of casing 7 is the bypass duct 6.

During any changes in engine operating conditions, the temperature of the working fluid in contact with the various parts of the turbine varies causes variations in the temperatures of the casing 7, the rotor disc 12 and the rotor blades 10. These variations are now however, equal because of the differences in the masses of the respective parts, and differences in the temperatures of the working fluid in contact with the parts. This results in differential thermal expansion between the rotating structure and the static structure which, together with the centrifugal growth of the rotor, varies the clearance between the blade tips and the shroud and affects the efficiency of the engine.

FIG. 2 shows diagrammatically a control mechanism for maintaining the clearance 16 within a pre-determined range. The shroud 14 which is of relatively thin section is supported at both ends from the radially outer shrouds 24 and 26 of the upstream and downstream stator vanes 20 and 22 by means of lugs 29 and 32 respectively. The shroud is also directly connected to the casing element 15 by dowels 28, and is further connected to the casing element through additional lugs 30 on the outer shroud of stator vane 22. The lug 30 engages an annular channel 34 in the casing element to form a connection with the casing element and the lug 32 engages a recess 36 on on the radially inner surface, of the shroud. The radially inner end of the vane 22 carries a static structure 38 by means of dogs 40 and flanges 42 which allow radial freedom of movement of the vane within the structure 38.

It can therefore be seen that when the casing element 15 expands or contracts the shroud 14 will be moved radially outwardly or inwardly along with the casing element and will vary the clearance 16.

In order to control the size of the clearance 16, a control mechanism, shown in diagrammatic form in FIG. 2, is provided which comprises a tube 44 to which hot, high pressure air bled from a high pressure stage of the compressor is fed via a plenum chamber 46. The tube passes through the stator vane 22 and emerges therefrom at the radially inner end thereof. The open end of the tube is disposed at a small distance from an axially extending flange 48 on the rotor disc 12. The clearance 49 between the flange 48 and the open end of the tube is such as to cause a restriction to flow of air from the tube.

The differential expansions of the casing element and the rotor which cause changes in the clearance 16 will cause proportional changes in the clearance 49. These changes will be equal to the changes in the clearance 16 if the expansions of the rotor blades 10 and the stator vanes 22 are equal. In practice these expansions will be very nearly equal because the blades and vanes are cooled to operate at about the same temperature, and their growths are small because their lengths are small compared with the overall diameter of the turbine.

A flow of relatively cold air is also connected with the plenum chamber 46 through passages 50 in the casing element 15. The pressures of the two air flows are arranged so that when the clearance 16 is at its correct value there is no flow through the passages 50 and the hot air from the plenum chamber 46 all flows out of the tube through the clearance 49. When there is a change in temperature sufficient to cause the clearance 16 to change, the clearance 49 between the tube 44 and flange 48 will also change in direct proportion. If the clearance 49 increases, the flow of hot gas which is restricted by orifices, (not shown) will be insufficient to maintain the same pressure in the plenum chamber 46 and relatively cold gas will flow through the passages 50 through plenum chamber 46 and into the tube 44 thus cooling the casing causing it to contract and reduce the clearance 16. Similarly, should the clearances decrease, hot gas flow through the restriction 49 will be further restricted and the constant hot gas flow into the plenum chamber 46 will now partly exhaust through the passages 50 thus heating the casing element causing it to expand and increase the clearance.

FIGS. 3 and 4 show the detail of the invention applied to an actual engine casing, and in these figures the same reference numerals are used to represent parts of the structure which are illustrated in both figures. The hot gas supply to the plenum chamber 46 is derived from a high pressure compressor stage and is directed around the combustion equipment 2 through passages 60 into tubes 62 from which it flows through a series of holes 64 to impinge on the shroud 14 for cooling the shroud. The flow then passes around the outside of the tubes 62 into a chamber 66 from which part of it enters transfer tubes 68 in the casing element 15 from which it reaches the plenum chamber 46, and hence into tube 44.

The transfer tubes 68 are fitted into passages 70 formed in the casing 7, but are spaced from the casing element to avoid heating it. The upstream ends of the tubes 68 also define a fixed orifice 69 which regulates the flow through the tubes.

The cool, or relatively cool, air is derived from a lower pressure stage of the compressor and is transferred into annular space 72 in the casing element (see FIG. 4) through tubes 74 in the bypass duct. The passages 50 extend between the space 72 and the plenum chamber 76 and from the plenum chamber 76 to the plenum chamber 46.

In can be seen that the hot gas will be further heated by impingement upon the hot shroud 14 while the relatively cold gas will be cooled further by its flow through the tubes 74 in the bypass passage, so that a significant temperature difference can be created to cause relatively rapid heating or cooling of the casing element 15 when required. A temperature difference between the heating and cooling air of about 325° C. has been shown to be a reasonable figure.

Since the casing element 15 should ideally be able to heat up quickly to expand away from an expanding turbine blade but not to cool quickly so as to reduce the possibility of rubbing between the blades and the shroud in transient conditions, the steady running temperature of the casing element should be biased towards the cooling air temperature. In this way the temperature difference between the casing element and the heating air will be large, and between the casing element and the cooling air will be smaller thus giving rapid heating and slower cooling of the casing element. Specific temperatures in a main engine assembly show that a casing temperature of 760° K. was suitable with a cooling air temperature 100° C. below this temperature and a heating air temperature of about 225° C. above this temperature.

It has been found that use of the present invention can enable the clearance 16 to be maintained close to 0.012 ins without a significant penalty in the use of the air bled from the compressor, so that an overall increase in engine efficiency can be obtained.

The particular benefit of the invention applied when it is used with an unshrouded turbine blade but clearly it can be applied to a shrouded turbine blade also to improve the efficiency of shrouded turbine blading. In such a case the end of the control tube 44 can be disposed close to the blade shroud instead of close to a flange on a disc and this will reduce any small difference between the size of the clearance to be controlled and the size of the clearance which provides the restriction 49.

Clearly many modifications to the design shown herein may be devised but which will still employ the fundamental features of the invention. For example the position at which the control clearance 49 is established is not critical and any convenient location where the change in clearance 49 can be made proportional to the tip clearance 16 will suffice.

The compressed air supplies used in the embodiments described are merely for convenience in a gas turbine engine. Other means of heating the static parts may be used particularly in machines other than gas turbine engines. Further, the embodiment described uses two supplies of air at different temperatures, although it may be possible to achieve a sufficient control using only a single supply of air the amount of which is varied over a wider range by the control means to vary the amount of heating or cooling. In a static gas turbine installation or other static machine an external fluid supply or supplies may be used.

We claim:

1. A bladed fluid flow machine including a non-rotating structure and a bladed rotor having a circumferential array of blades around the periphery thereof and spaced radially at their tips from the non-rotating structure to define a clearance therebetween, and wherein there is provided clearance control mechanism comprising, a casing element forming part of the non-rotating structure and comprising a shroud from which the tips of the blades are spaced to define the clearance, first passages in the casing element for receiving a relatively high temperature, high pressure fluid, second passages in the casing element for receiving a relatively lower temperature and lower pressure fluid, means for supplying the two fluids of differing temperatures and pressures respectively to said first and second passages, said first and second passages communicating with a common plenum chamber, and control means comprising ducting communicating between said common plenum chamber and a restriction which varies in size in proportion to the clearance to be controlled, the pressures of the two fluids being relatively adjusted so that as the size of the restriction varies the amount of relatively higher or lower temperature fluids flowing in the respective passages varies to control the temperature of said casing element to maintain the size of the clearance in a pre-determined range.

2. A bladed fluid flow machine as claimed in claim 1 and in which the casing element comprises a shroud ring surrounding and spaced from the tips of the rotor blades, means being provided for connecting the shroud ring to the remainder of the casing element for movement therewith when the casing element expands or contracts.

3. A bladed fluid flow machine as claimed in claim 1 and in which the machine is a gas turbine engine including compressor means and wherein two supplies of compressed air are taken at different temperatures and pressures from the engine compressor means.

4. A bladed fluid flow machine as claimed in claim 3 and in which the higher temperature air supply is arranged to cool the shroud ring prior to entry into the passages in the casing element.

5. A bladed fluid flow machine as claimed in claim 2 and in which the rotor carries a control surface and the flow of working fluid through the casing element is exhausted through the ducting formed in adjacent static structure connected to the casing element, the exit of the ducting being disposed in close proximity to the control surface to define said restriction therewith through which said fluid flows, and wherein the control surface and said static structure are so arranged that any change in the clearance between the blade tips and the shroud ring results in a proportional change in the restriction.

6. A bladed fluid flow machine as claimed in claim 5 and in which the ducting defined by a tube which connects the restriction with, plenum chamber in the casing element.

7. A by-pass gas turbine engine including compressor means, a non-rotating structure and a bladed rotor having a circumferential array of blades around the periphery thereof and spaced radially at their tips from the non-rotating structure to define a clearance therebetween, and wherein there is provided clearance control mechanism comprising, a casing element forming part of the non-rotating structure and from which the tips of the blades are spaced to define the clearance, said casing element having passages therein, conduit means to supply compressed fluid from said compressor means to said passages at different temperatures, the conduit means for the supply of lower temperature air being in heat exchange relation to the by-pass air, and means responsive to a change in the size of the clearance for controlling the temperature of the fluid in the casing element to cause said expansion or contraction to take place in a direction to maintain the size of the clearance in a pre-determined range.

8. A bladed fluid flow machine as claimed in claim 7 and in which there is a tube which passes through a stator vane adjacent the bladed rotor, fluid being exhausted from said supply means through said tube, means defining a control surface at the exhaust end of said tube which moves relative to the tube end to control rate of exhaust from said supply means.

* * * * *